(12) United States Patent
Nishikawa

(10) Patent No.: US 6,990,204 B2
(45) Date of Patent: Jan. 24, 2006

(54) INTERFACE SECURITY SYSTEM AND METHOD

(75) Inventor: Meisei Nishikawa, Musashino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 944 days.

(21) Appl. No.: 09/816,479

(22) Filed: Mar. 26, 2001

(65) Prior Publication Data

US 2001/0033662 A1 Oct. 25, 2001

(30) Foreign Application Priority Data

Mar. 27, 2000 (JP) .................................. P2000-087390

(51) Int. Cl.
H04L 9/20 (2006.01)

(52) U.S. Cl. ...................................... 380/262; 380/260
(58) Field of Classification Search ................ 380/262, 380/260, 239, 33; 710/108
See application file for complete search history.

(56) References Cited

U.S. PATENT DOCUMENTS 4,168,396 A * 9/1979 Best .......................... 713/190
5,748,734 A * 5/1998 Mizikovsky ................ 380/247
6,044,388 A * 3/2000 DeBellis et al. ............ 708/254
6,209,098 B1 * 3/2001 Davis ........................ 713/194
6,522,274 B1 * 2/2003 Amar et al. ................ 341/141
6,628,786 B1 * 9/2003 Dole ........................... 380/44
6,694,430 B1 * 2/2004 Zegelin et al. .............. 713/160

FOREIGN PATENT DOCUMENTS

JP        6-083200        10/1994

* cited by examiner

Primary Examiner—Gregory Morse
Assistant Examiner—Andrew L Nalven
(74) Attorney, Agent, or Firm—Oblon, Spivak, McClelland, Maier & Neustadt, P.C.

(57) ABSTRACT

In an interface security system between a plurality of devices mutually connected and transmitting/receiving a signal, the respective devices include respective selectors selecting a connection pattern between signals transmitted/received and external terminals for transmitting/receiving the signals and switching connections between the signals and the external terminals in accordance with a connection pattern selected, and the selectors of the respective devices select a connection pattern and switch the connections in synchronization between the respective devices.

19 Claims, 13 Drawing Sheets

INTERFACE SECURITY SYSTEM AND METHOD

CROSS REFERENCE TO RELATED APPLICATIONS

This application claims benefit of priority under 35 USC §119 to Japanese Patent Application No. 2000-087390 filed on Mar. 27, 2000, the entire contents of which are incorporated by reference herein.

BACKGROUND OF THE INVENTION

1. Field of the Invention

The present invention pertains to a security technique such as for data in an interface between devices and to, for example, a technique for preventing leakage or the like of the data exchanged between ICs.

2. Description of the Related Art

Environment of the development and diffusion of multimedia has been prepared through progress in the digitization technique. Since information formed into digital data does not change its quality even in processing such as storing, reproducing, communicating, its application has been steadily expanded.

Through an information content compression technique or the like, information such as not only characters and graphics but also voice and video has been able to be processed, stored, and reproduced digitally.

In the back of these techniques, infringement of copyright and the like through an illegal copy or the like has become a problem, and thus various technical methodology for preventing reproduction of written materials or the like have been taken. For example, SCMS (Serial Copy Management System) is implemented in the CD, MD, DAT, CD-R, and the like for music, and CGMS (Copy Generation Management System) or the like is implemented in the DVD (Digital Versatile Disk).

A typical example of a digital music player in which a memory card is employed is shown in FIG. 1.

Audio data such as in music which is formed into digital data are compressed, for example, by an information content compression technique, and after specific cryptography is incorporated in a specific portion by a copy protection technique, those audio data are recorded in a memory card 111.

The data recorded in the memory card 111 are read by the a card I/F section 121, cryptography incorporated in the data is decrypted by a decryption section 122, data compressed are decoded by a compressed signal decode section 131 and are converted into an analog signal by a DAC (Digital-Analog Converter) section 141 so as to be sent to an output device such as a speaker. In the drawing, the parts shown by broken lines show configurational units of the apparatus, and the present digital music player is composed of a card slot 110 holding the memory card 111, an IC-120 having the card I/F section 121 and the decryption section 122, an IC-130 having the compressed signal decode section 131, and an IC-140 having the DAC section 141. The respective devices or blocks are connected by wiring 151 to 154.

As shown in the drawing, since the data flowing between the card slot 110 and the IC-120 are encrypted in advance, the confidentiality thereof is maintained. However, on and after the IC-120, that is, the data flowing between the IC-120 and the IC-130 and between the IC-130 and the IC-140 are digital data whose cryptography is released by the decryption section 122 in order to reproduce music data. Specifically, the data flowing between the IC-130 and the IC-140 are the data further decoded by the compressed signal decode section 131. Accordingly, it is not impossible to connect a measuring device such as a probe to the wiring portions 153, 154 to absorb data so as to use them wrongly.

That is, it is the present situation that although a copy protection technique employed conventionally is applied to an interface section provided in the external of an apparatus such as in between a memory card and a music player, it has not fully covered, for example, an interface between ICs inside a music player apparatus.

In order to solve such problem in a digital music player as shown in FIG. 1, although a method may be thought wherein the IC-120, the IC-130, the IC-140 are formed into one chip, such method is difficult to be realized actually due to problems in a manufacturing cost, a technical problem, and the like.

In general, in such interface between ICs, terminals are specified by data, clock, a latch signal, or the like, and by employing a measuring device, a signal flowing between ICs can be surmised, and even the data transferred may be read. In some cases, data may be exchanged between ICs in a state without any cryptography or scrambling depending on the data.

Further, since, for example, music data, video data, or the like have only several types of transfer formats, specifying a format is easy, and thus such data are likely to be falsely copied in a state where a copyrighted material is a high grade digital signal. With respect to data having a high concealment property, a protection such as cryptography is given to the data themselves in advance, but an interface between chips inside an apparatus is often in a defenseless state.

This type of problem exists not only regarding a reproduction device for music or video software but also similarly regarding an information processing apparatus, for example, for operating a computer program or game software and also is contained in an information transmission means or the like employing a network or a digital broadcast.

SUMMARY OF THE INVENTION

The present invention is developed to solve the above-described problems, and it is an object of the present invention to provide interface security system and method by which leakage or the like of data and the like exchanged between devices can be prevented by making an interface between devices such as ICs switchable between the devices.

In order to solve the above-described problems, the present invention embraces an interface security system between devices connected to each other and transmitting/receiving a signal, characterized in that the interface security system encompassing a first device including a selector selecting a connection pattern between a signal transmitted/received and an external terminal for transmitting/receiving the signal based on a switch signal and a switch switching a connection between the signal and the external terminal in accordance with a connection pattern selected by the selector, and a second device including a selector selecting a connection pattern between a signal transmitted/received and an external terminal for transmitting/receiving the signal based on a switch signal and a switch switching a connection between the signal and the external terminal in accordance with a connection pattern selected by the selector, wherein the selector of the second device inputs a switch signal of the same value as the switch signal that the selector of the first device inputs.

According to embodiments of the present invention, since the corresponding relationship between the signal transmitted/received and the external terminal is switched in accordance with a connection pattern set up between the respective devices, specifying a signal, for example, data, flowing between the devices becomes difficult.

A second embodiment of the present invention is characterized in that the respective first device and second device have bidirectional buffers connected to the external terminals, and the selectors of the respective devices control the bidirectional buffers, respectively, so as to switch the direction of input/output of the external terminals in accordance with the connection pattern.

According to embodiments of the present invention, since not only the corresponding relationship between the signal transmitted/received and the external terminal but also the relationship of the input/output of the terminal are switched in accordance with a connection pattern set up between the respective devices, specifying a signal, for example, data, flowing between the devices becomes further difficult.

Other objects, characteristics, and effects of the present invention are made clear further through the detailed explanation described below referring to drawings.

DETAILED DESCRIPTION OF THE PREFERRED EMBODIMENT

Embodiments of the present invention are explained below based on drawings.

(First Embodiment)

Figure 1:
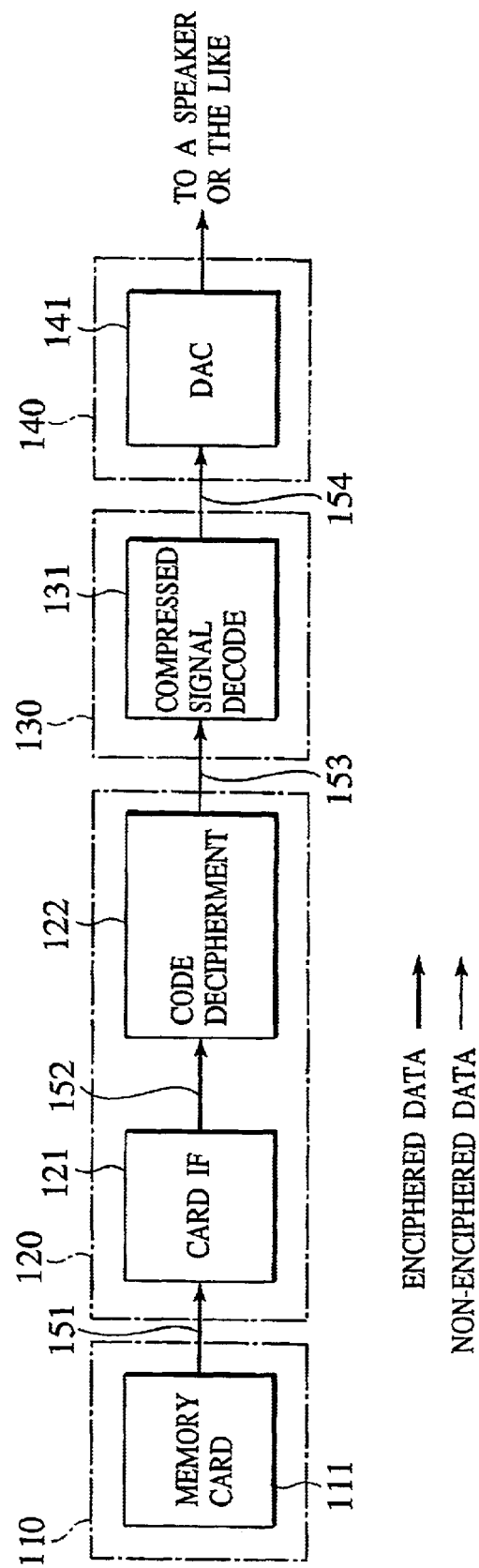
FIG. 1 is a block diagram showing a configuration example of a digital music player in which a memory card is employed.
Figure 2:
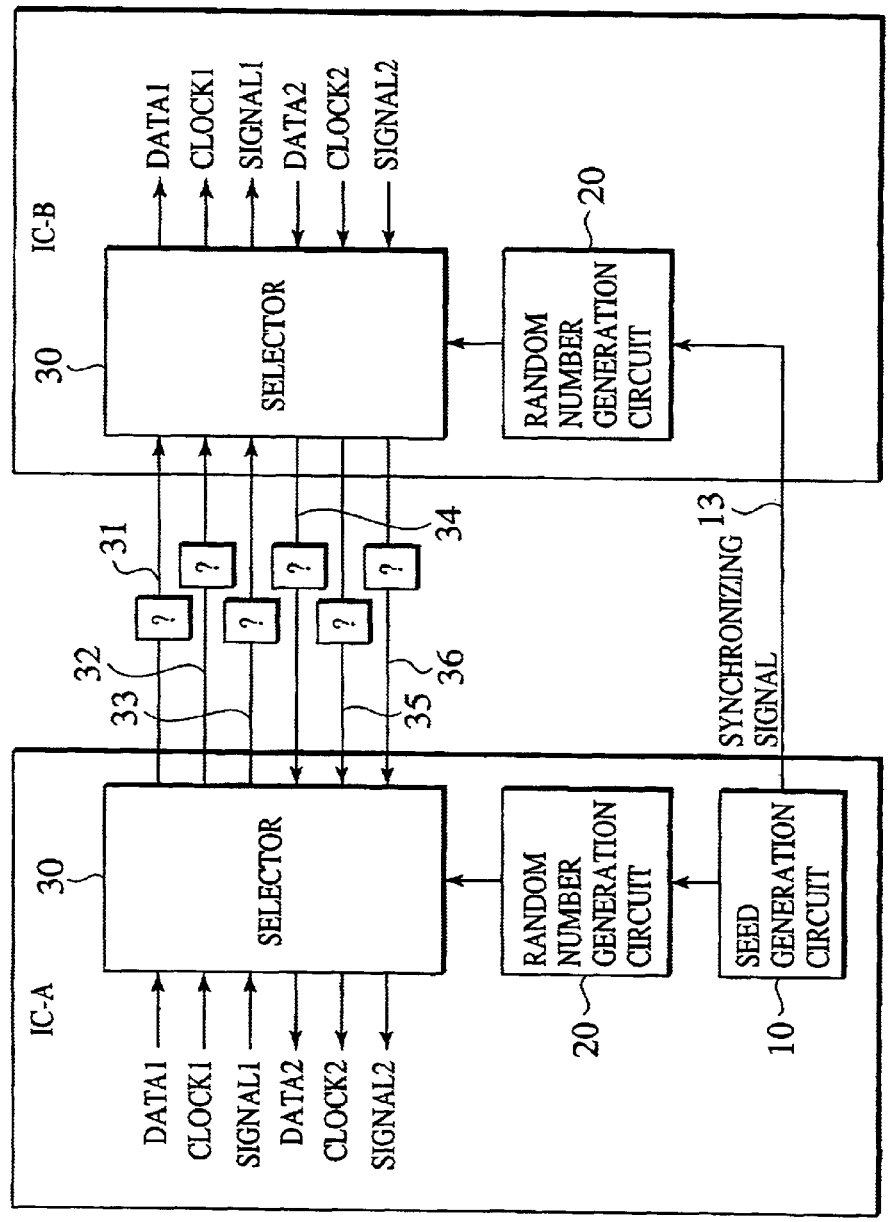
FIG. 2 is a schematic diagram showing an embodiment in which an interface security system according to the present invention is applied to ICs.

FIG. 2 is a schematic diagram showing an embodiment of an interface security system according to the present invention. In the present embodiment, shown is an example in which two ICs, IC-A (first device) and IC-B (second device), are connected by six signal lines of DATA1, CLOCK1, SIGNAL1, DATA2, CLOCK2, AND SIGNAL2. Respective signals of DATA1, CLOCK1, and SIGNAL1 are sent from the IC-A to the IC-B, and respective signals of DATA2, CLOCK2, and SIGNAL2 are sent from IC-B to IC-A. In a conventional interface between ICs, it is specified that DATA 1 passes on a line 31, CLOCK1 a line 32, SIGNAL1 a line 33, DATA2 a line 34, CLOCK2 a line 35, and SIGNAL2 a line 36.

The IC-A has a SEED generation circuit 10 generating seeds of random numbers, a first random number generation circuit 20 generating random numbers from the seeds that the SEED generation circuit 10 generates, and a first selector circuit 30 switching the lines 31 to 36 based on the first random numbers that the random number generation circuit 20 generates, and the IC-B has a second random number generation circuit 20 generating random numbers from seeds 13 that the SEED generation circuit 10 generates and a second selector circuit 30 switching the signal lines 31 to 36 employed based on the random numbers that the second random number generation circuit 20 generates. Although the SEED generation circuit 10 can be either in the IC-A or in the IC-B, the present embodiment shows an example in which it is in the IC-A. The first and second random number generation circuits 20 are supposed to have the same hardware structures in the IC-A and IC-B, and the same random numbers are formed from the same seeds in synchronization to each other. The first and second selector circuits 30 in the IC-A and the IC-B switch a corresponding relationship between internal signals and external input/output terminals based on the random numbers that the first and second random number generation circuits 20 generate in synchronization to each other.

An operation example of an interface security system according to the present invention is explained further in detail below.

First, SEED data that are seeds of random numbers are generated in the SEED generation circuit 10 before communication of signals (data) is performed between the IC-A and the IC-B such as at power on time of the apparatus main body. A specific example of the SEED generation circuit 10 is shown in FIG. 3.

Figure 3:
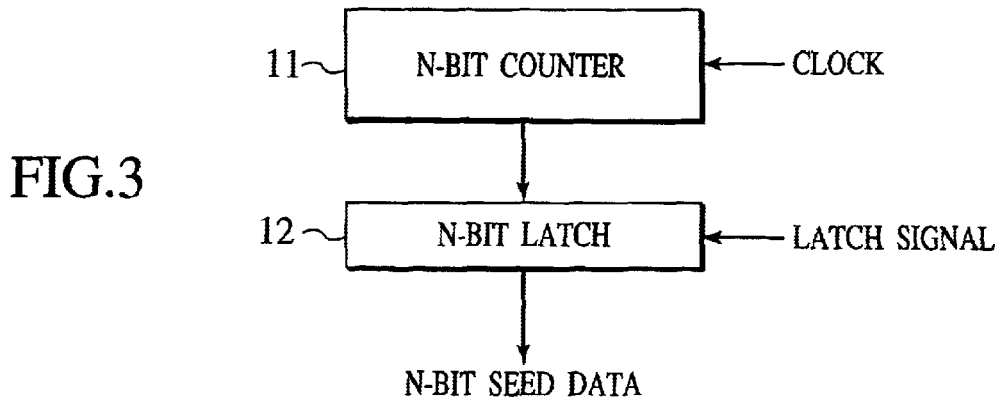
FIG. 3 is a schematic diagram showing an embodiment of a SEED generation circuit.

In FIG. 3, the SEED generation circuit 10 has an N-bit counter 11 and an N-bit latch circuit 12. The N-bit counter 11 is a counter counting in synchronization with a clock signal and performs counting of necessary bit numbers (N bits). Even when this type of counter is not prepared specially, if there is a counter of a necessary bit number or more inside the IC, it can be employed. When not a counter but shift registers whose values constantly change are studded, necessary bit numbers of registers are selected and may be employed as data.

The N-bit latch circuit 12 generates N-bit data that the N-bit counter 11 generates as seeds of N-bit random numbers in synchronization with a latch signal. Accordingly, by the timing of sending this latch signal the values of SEED data are decided. Although that the timing of sending the latch signal may generally be an initial operation time such as at a time of power on, for example, when the case of a digital music player is taken, pressing down of a play button may be a trigger. A case may be effective in a sense to eliminate repeatability wherein a trigger is not of a certain regular cycle. By setting a trigger at a time when a circumstance of the system changes such as at a time of pressing down a play button, even if the synchronization falls into disorder, the synchronization can be restored.

It is set that the SEED data do not become zero. It is necessary to set a sequence in such a manner as to be generated over again when a zero is detected or to provide a circuit for setting a arbitrary value or the like.

The SEED data obtained like this are sent to both first and second random number generation circuits 20 of the IC-A and IC-B. Various modes can be devised for the first and second random number generation circuit 20, and for example, a circuit generating a maximum long period sequence (M-sequence) which is generally popularly employed may be employed.

Figure 4:
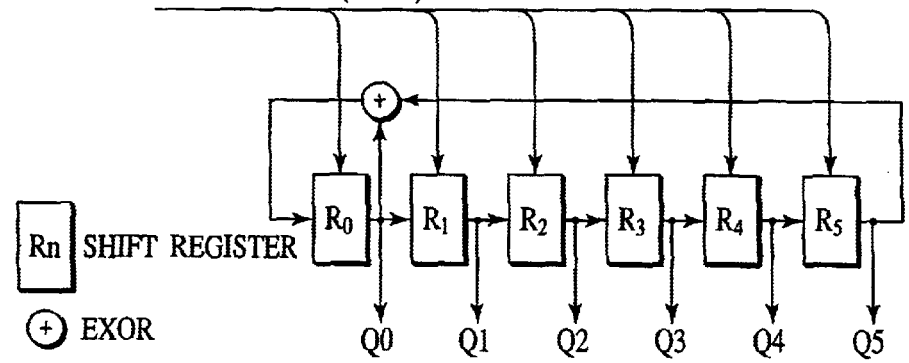
FIG. 4 is a circuit diagram showing an embodiment of a random number generation circuit.

A specific example of a circuit generating 6-bit random numbers is shown in FIG. 4. As shown in FIG. 4, the circuit inputs the 6-bit SEED data being initial values and is comprised of six steps R0 to R5 of linear shift registers and respective feedback taps so that 6-bit random numbers Q0 to Q5 of maximum 63 cycles can be generated.

The circuit generating such random numbers is provided as the first and second random number generation circuits 20 in both IC-A and IC-B. At this time, circuits of the same configurations are installed in both. That is, the same frequencies and phases of clocks of the shift registers are employed. Thus, both input the SEED data from the SEED generation circuit 10 as initial values to generate random numbers so that the random number data outputted from the first random number generation circuit 20 of the IC-A and the random number data outputted from the second random number generation circuit 20 of the IC-B become the same random numbers constantly.

Figure 5:
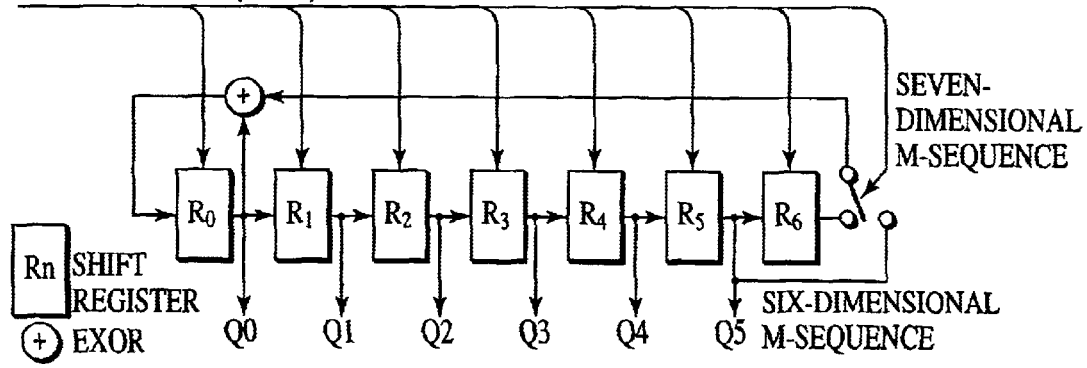
FIG. 5 is a circuit diagram showing another embodiment of a random number generation circuit.

As shown in FIG. 5, it is possible to provide a selector to form a circuit configuration so as to change the number of bits. In the example shown in FIG. 5, it is possible to select either a case where six-dimensional M-sequence is formed or a case where seven-dimensional M-sequence is formed and switch them by the selector. In this case, the number of bits of the SEED data sent from the SEED generation circuit 10 needs the number of bits corresponding to the M-sequence and the selected signal.

Figure 6:
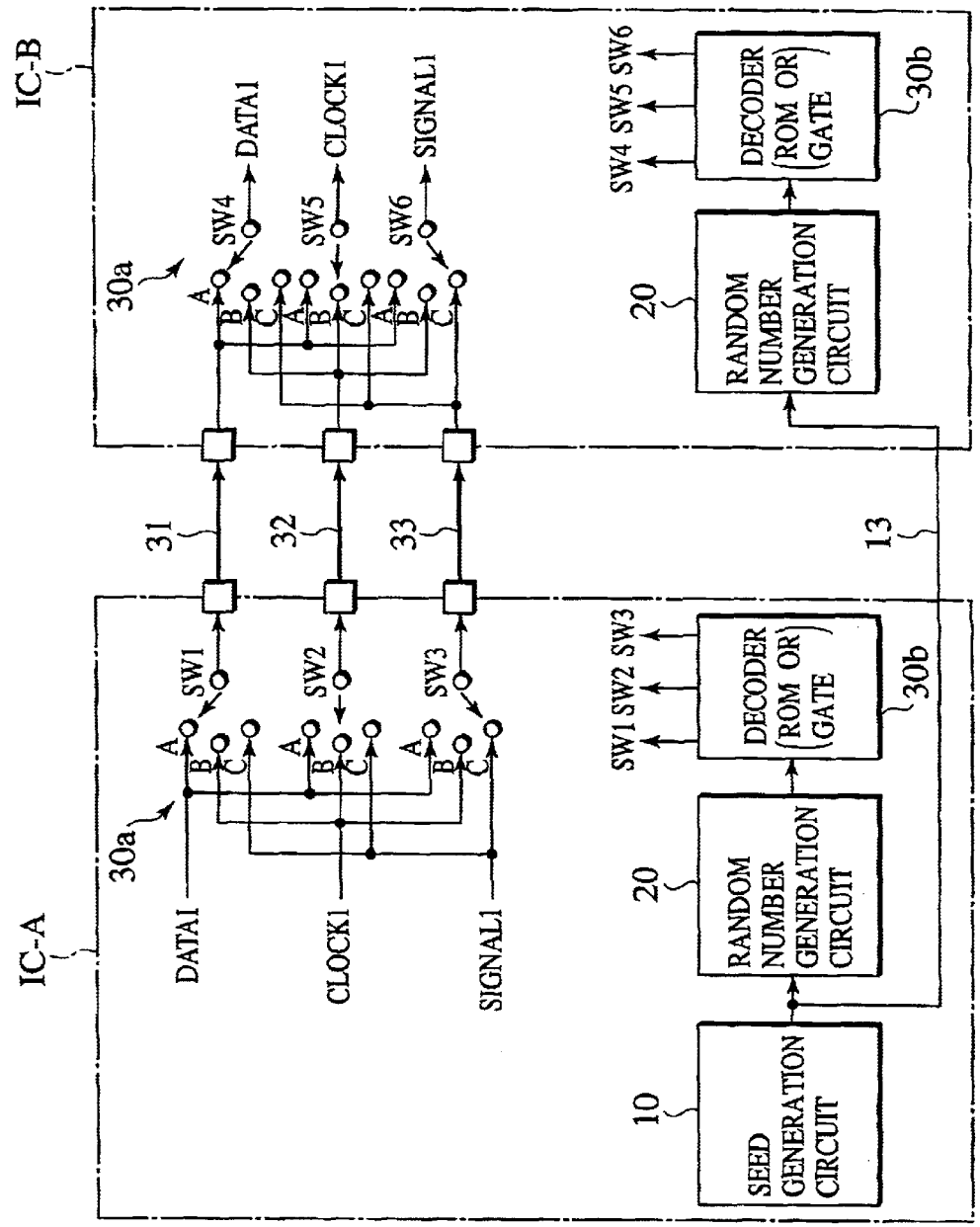
FIG. 6 is a circuit diagram showing a configuration example of a selector circuit.

Then, the data outputted from the first and second random number generation circuits 20 are inputted to the selector circuits 30, and the first and second selector circuits 30 work so as to connect the internal circuit and the external terminals in accordance with a fixed specific connection pattern. FIG. 6 shows a specific example of the first and second selector circuit 30 selecting and switching three kinds of signals (DATA1, CLOCK1, AND SIGNAL1).

The decoder circuits 30*b* of the first and second selector circuits 30 generate control signals controlling respective first and second switch circuits 30*a* based on the N-bit random number data generated by the first and second random number generation circuits 20 in the IC-A and IC-B. The first and second decoder circuits 30*b* may utilize, for example, ROM (Read Only Memory) or may be one utilizing a gate circuit.

Table 1 shows each value of 3-bit random numbers and a selection example of the switch circuits 30*a* corresponding thereto. The decoder circuits 30*b* generate control signals controlling the switch circuits 30*a* (SW1 to SW6) of the selector circuits 30 according to the connection pattern (corresponding relationship) regulated by that table, respectively. Since "000" is a value which cannot be taken in M-sequence as a random number value, "no data (–)" is given in the table.

TABLE 1

| RANDOM NUMBER VALUE | SW1 | SW2 | SW3 | SW4 | SW5 | SW6 |
|---|---|---|---|---|---|---|
| 000 | — | — | — | — | — | — |
| 001 | A | B | C | A | B | C |
| 010 | A | C | B | A | C | B |
| 011 | B | A | C | B | A | C |
| 100 | B | C | A | B | C | A |
| 101 | C | A | B | C | A | B |
| 110 | C | B | A | C | B | A |
| 111 | A | B | C | A | B | C |

For example, when the random number value is "001", the decoder circuit 30*b* of the IC-A side gives control signals of SW1=A, SW2=B, SW3=C to the respective switches SW1 to SW3. As a result, SW1 of the selector circuit 30 is connected to DATA1, SW2 CLOCK 1, and SW3 SIGNAL 1. Similarly, the decoder circuit 30*b* of the IC-B side gives control signals of SW4=A, SW5=B, SW6=C to the respective switches SW4 to SW6, and SW4 of the selector circuit 30 is connected to DATA1, SW5 CLOCK1, and SW6 SIGNAL1.

Thus, an interface between the IC-A and the IC-B is established. That is, DATA1 is transferred through the signal line 31, CLOCK1 the signal line 32, and SIGNAL1 the signal line 33.

Then, for example, when the random number changes to "101", the state is changed in such a manner that DATA1 is transferred through the signal line 31, CLOCK1 the signal line 33, and SIGNAL1 the signal line 32.

Both of the transmitting side and the receiving side synchronize to perform such switching, whereby exchange of data signals can be performed correctly.

By setting in such a manner that the random number values keep changing constantly, when, for example, an external terminal is directed attention, an outputted signal changes every time the random number value changes, whereby it becomes possible to disturb a person trying to exploit data falsely. The timing of generation of a random number and switching of signals is not only at the time of initial setting, and, for example, it may be set at a timing frequently switching such as at each time 1 data are sent, at a time of reference clock input of both ICs, or the like, thereby imparting further effectiveness.

Second Embodiment

In the first embodiment, explained is an example in which the inputs/outputs of the respective first and second external terminals of both ICs are fixed. In the present embodiment, explained is a mode in which bidirectional buffers are connected to the first and second external terminals, and input/output control of these bidirectional buffers is performed by random numbers that the random number generation circuits generate. A specific example in which the bidirectional buffers are employed is shown in FIG. 7.

Figure 7:
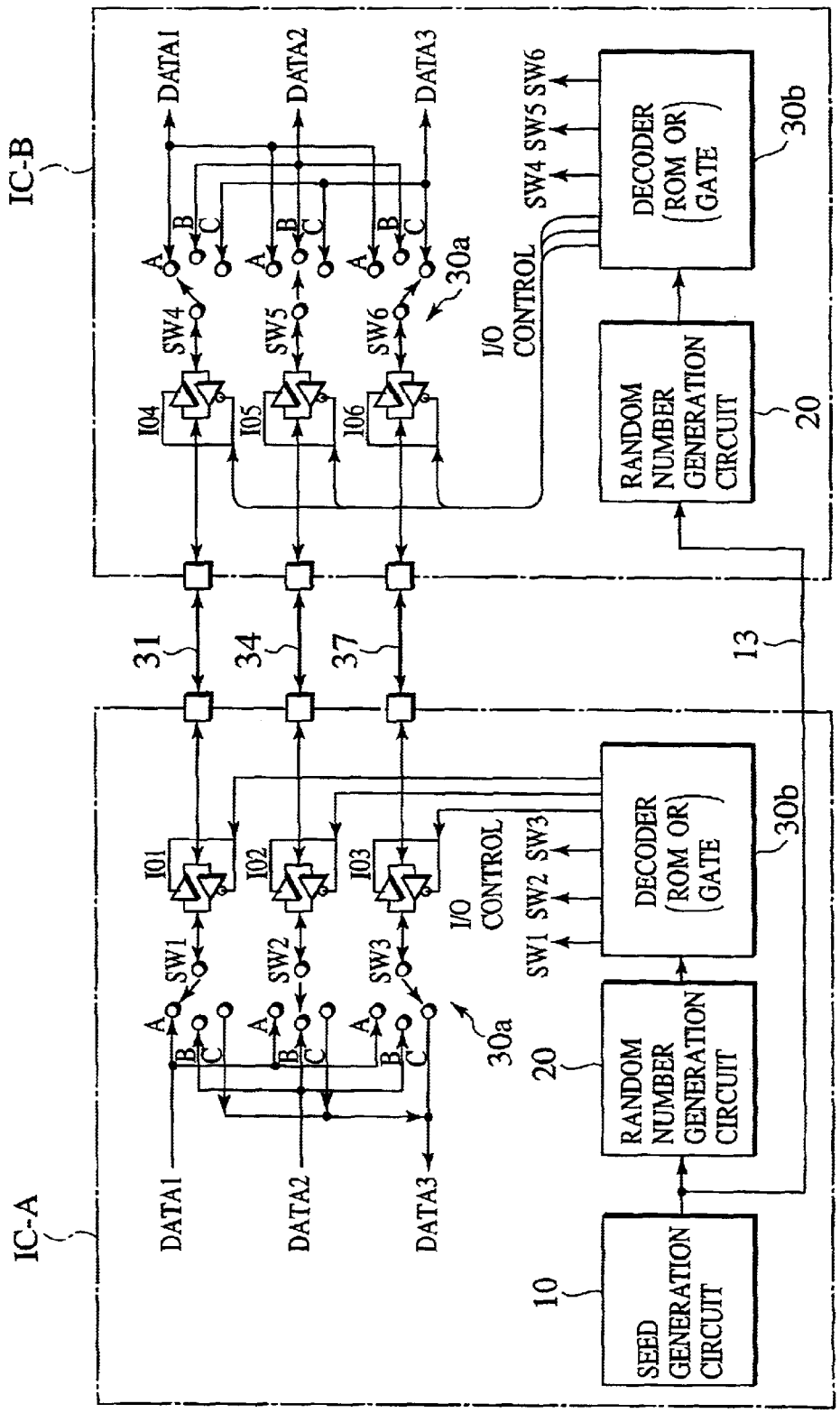
FIG. 7 is a circuit diagram showing an embodiment in which input/output control is performed employing bidirectional buffers.

In the example shown in FIG. 7, its specification is supposed that there are three kinds of signals of DATA1, DATA2, and DATA3 as internal signals, and DATA1 and DATA2 are sent from the IC-A to the IC-B, and inversely, DATA3 is sent from the IC-B to the IC-A. first and second Bidirectional buffers IO1 to IO6 are installed between the switches SW1 to SW6 and the first and second external terminals.

The SEED generation circuit 10 and the first and second random number generation circuits 20 are similar to those explained in the first embodiment.

The decoder circuits 30b generate control signals controlling the switching circuits 30a (SW1 to SW6) of the first and second selector circuits 30 and further control signals controlling the bidirectional buffers IO1 to IO6 based on the random numbers that the first and second random number generation circuits 20 generate.

Table 2 shows each value of 3-bit random numbers, a selection example of the switch circuits 30a (SW1 to SW6) corresponding thereto, and an input/output switching example of the first and second bidirectional buffers IO1 to IO6. In the table, "OUT" means that a signal from an external terminal of the IC is outputted, and "IN" means that a signal from the external is inputted to that terminal of the IC.

TABLE 2

| RANDOM NUMBER VALUE | SW1 | SW2 | SW3 | SW4 | SW5 | SW6 | IO1 | IO2 | IO3 | IO4 | IO5 | IO6 |
|---|---|---|---|---|---|---|---|---|---|---|---|---|
| 000 | — | — | — | — | — | — | — | — | — | — | — | — |
| 001 | A | B | C | A | B | C | OUT | OUT | IN | IN | IN | OUT |
| 010 | A | C | B | A | C | B | OUT | IN | OUT | IN | OUT | IN |
| 011 | B | A | C | B | A | C | OUT | OUT | IN | IN | IN | OUT |
| 100 | B | C | A | B | C | A | OUT | IN | OUT | IN | OUT | IN |
| 101 | C | A | B | C | A | B | IN | OUT | OUT | OUT | IN | IN |
| 110 | C | B | A | C | B | A | IN | OUT | OUT | OUT | IN | IN |
| 111 | A | B | C | A | B | C | OUT | OUT | IN | IN | IN | OUT |

For example, when the random number value is "001", the decoder circuit 30b of the IC-A side gives control signals of SW1=A, SW2=B, SW3=C to the respective switches SW1 to SW3 and further gives control signals of the first bidirectional buffer IO1=OUT, IO2=OUT, and IO3=IN to the respective buffers IO1 to IO3. As a result, SW1 of the selector circuit 30 is connected to DATA1, SW2 DATA2, and SW3 DATA3, and the bidirectional buffer IO1 is controlled to do output, IO2 also to output, and IO3 to input. Similarly, the decoder circuit 30b of the IC-B side gives control signals of SW4=A, SW5=B, SW6=C to the respective switches SW4 to SW6, the switch SW4 of the selector circuit 30 is connected to DATA1, the switch SW5 DATA 2, and the switch SW6 DATA 3, and the second bidirectional buffer IO4 is controlled to do input, IO5 also to output, and IO6 to output.

Thus, an interface between the IC-A and the IC-B is established. That is, DATA 1 is transferred from the IC-A to the IC-B through the signal line 31, DATA 2 is transferred from the IC-A to the IC-B through the signal line 34, and DATA 3 is transferred from the IC-B to the IC-A through the signal line 37.

Similarly, when the random number changes to "010", the state is changed so that DATA1 is transferred from the IC-A to the IC-B through the signal line 31, DATA2 is transferred from the IC-A to the IC-B through the signal line 37, and DATA3 is transferred from the IC-B to the IC-A through the signal line 34.

Since variations in combination are likely to be limited if only control of change in a row of signals is performed, by adding control of input/output further, more complex connections can be performed.

(Third Embodiment)

Figure 8:
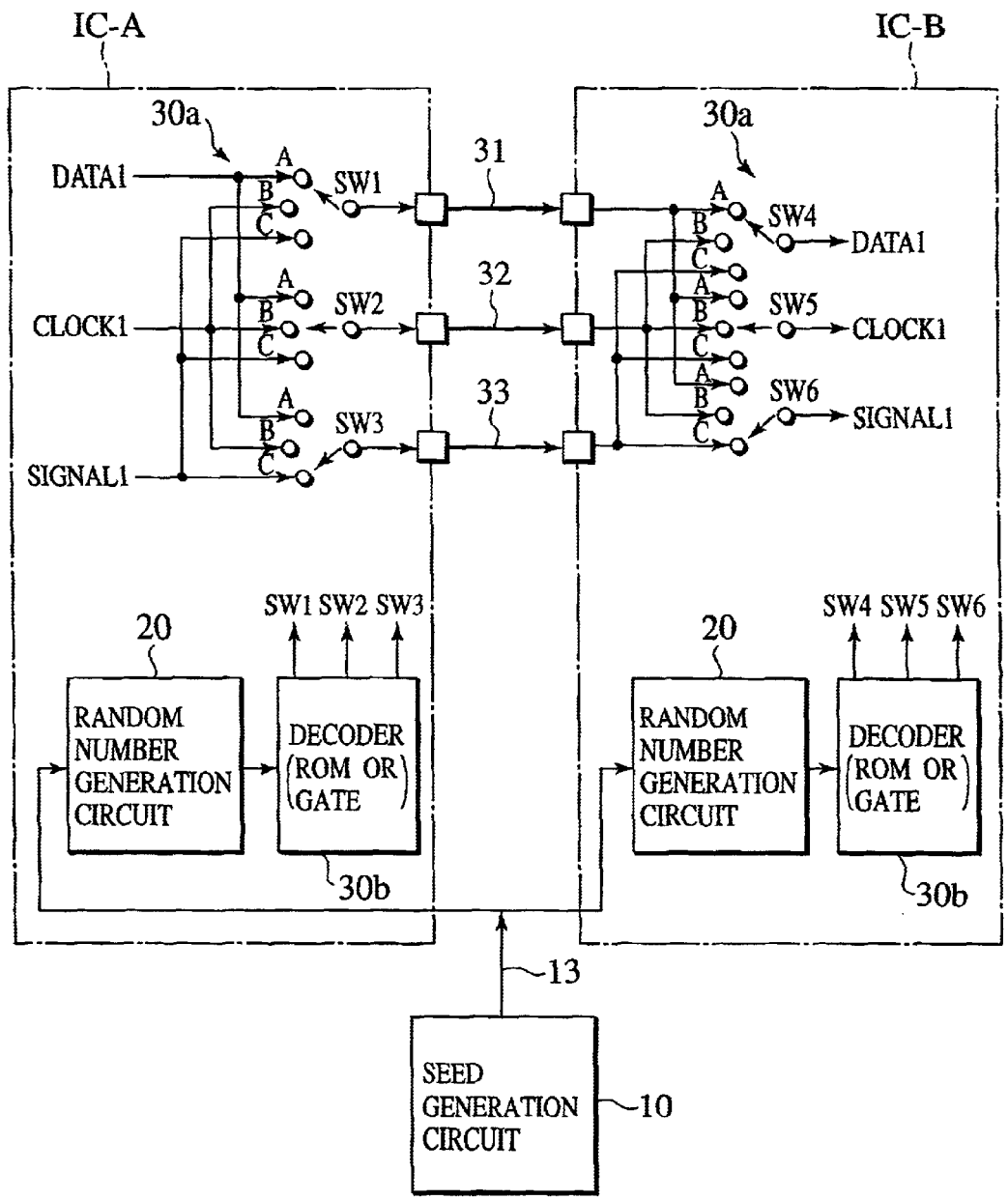
FIG. 8 is a circuit diagram showing an example in which the SEED generation circuit is arranged in the external.

Although in the first embodiment and the second embodiment, shown is an example in which the SEED generation circuit 10 is installed in the IC-A (or the IC-B), in the present embodiment, shown in FIG. 8 is an example in which the SEED generation circuit 10 is installed in the external.

As shown in the drawing, seeds of random numbers 13 (SEED data) are sent from the SEED generation circuit 10 arranged in the external to the first and second random number generation circuits 20 of the respective ICs (IC-A and IC-B). This SEED generation circuit 10 may be installed as one chip of the external or may be incorporated in a microcomputer section or the like controlling the entire system. When it is incorporated in a microcomputer, a mechanism may be taken wherein the seeds are software-like generated.

By configuring like this, shown parts of the IC-A and IC-B can have the same configurations.

(Fourth Embodiment)

Figure 9:
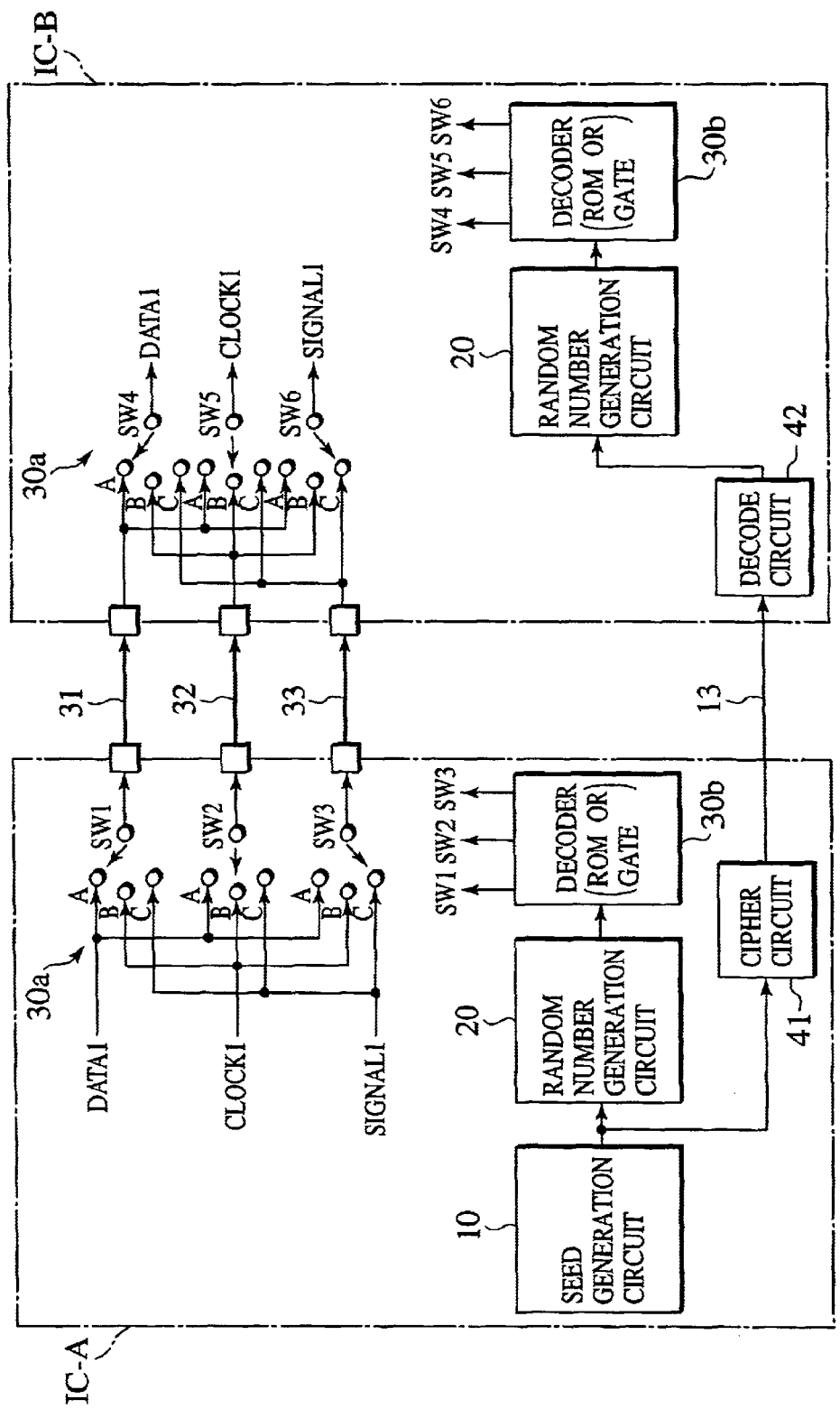
FIG. 9 is a circuit diagram showing an example in which a cryptography circuit is provided inside the IC-A and a decode circuit inside the IC-B.

When the SEED data generated inside the IC-A are sent to the IC-B, in order to enhance the concealment property of the sent data, such data may be encrypted and sent. Its example is shown in FIG. 9. The configuration exemplified in the present embodiment is similar to the configuration example previously shown in FIG. 6 except that a cryptography circuit 41 is provided inside the IC-A and a decode circuit 42 inside the IC-B.

The SEED data that the SEED generation circuit 10 inside the IC-A generates are sent to the first random number generation circuit 20 and the cryptography circuit 41 inside the IC-A. The cryptography circuit 41 gives an encryption process to the inputted SEED data in a predetermined mode and transmits them to the IC-B.

The encrypted SEED data are inputted in the decode circuit 42 inside the IC-B, and the decode circuit 42 performs a decode process for restoring the encrypted SEED data in a predetermined mode. The decoded SEED data are inputted to the second random number generation circuit 20 in the IC-B. Processing operations on and after the first and second random number generation circuit 20 are similar to those in the example shown in the first embodiment. Although the present embodiment is shown as a variation example of the first embodiment, it is possible to combine with the second embodiment or the third embodiment.

As described above, by encrypting the SEED data so that a third party cannot decrypt, transferring them from the IC-A to the IC-B, and switching the connection pattern between the internal signals and the external input/output terminals in the connection between the devices based on the random numbers generated through the SEED data decoded in the same mode as that employed in the encryption, the concealment property can be further enhanced.

A cryptography mode employed in the cryptography circuit 41 and the decode circuit 42 is not specifically limited and may be, for example, an existing cryptography mode such as a public key cryptography such as RSA(Rivest-Shamir-Adleman) cryptography.

Other than the method in which the above-mentioned cryptography is employed, a method may be adopted wherein the SEED generation circuit 10 may be set so as to constantly output various values, and the first and second random number generation circuits 20 may acquire the SEED data from them at a specific timing. For example, a prescript may be adopted wherein when a predetermined value is outputted from the SEED generation circuit 10, m-th data counted from that value are employed.

(Fifth Embodiment)

Although in the first embodiment to the fourth embodiment, explained is a mode in which so called pseudo-random numbers are employed, in the present embodiment, explained is an example in which physical random numbers generated by utilizing a random phenomenon in the natural world are employed as random numbers whose periodicity, regularity, and repeatability are lower and whose unpredictability is higher.

Figure 10:
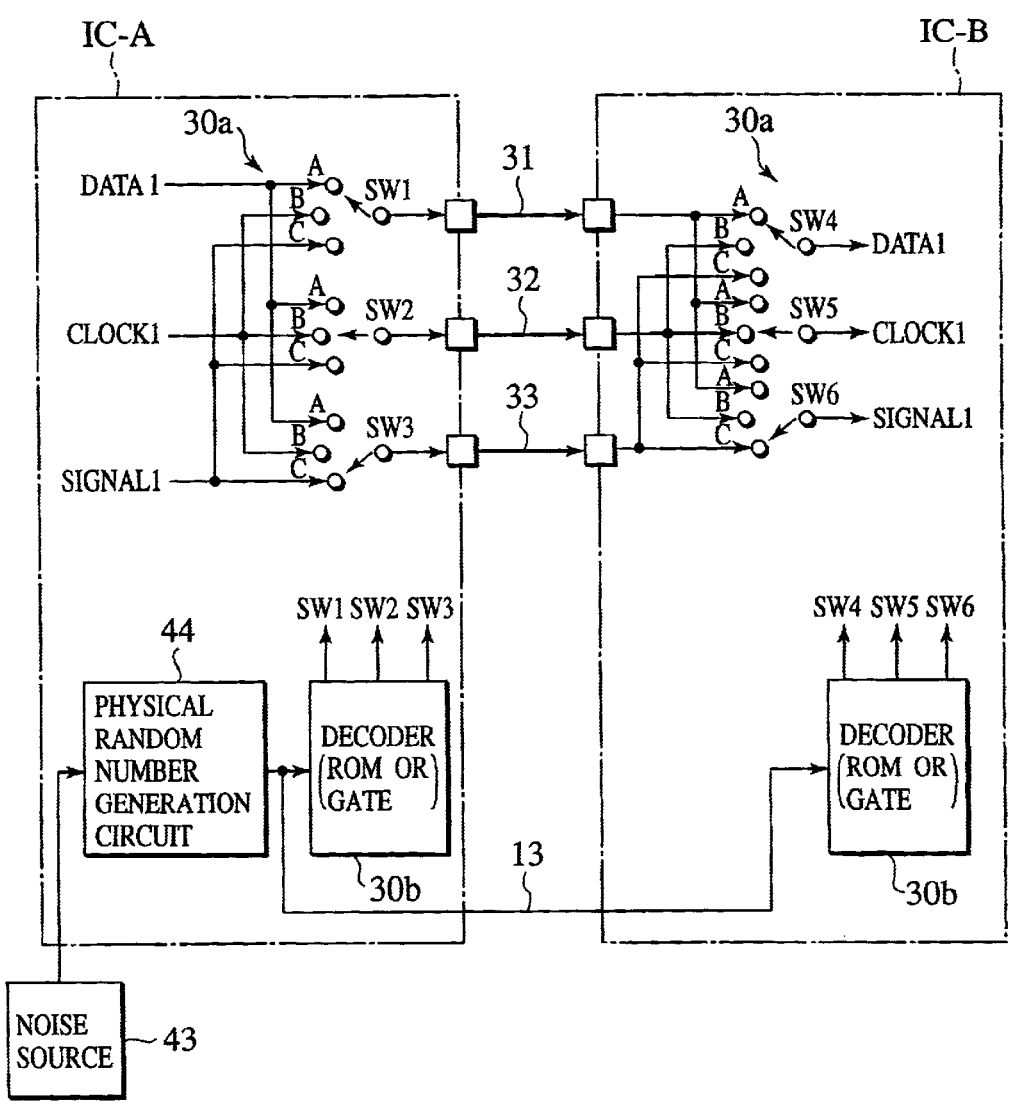
FIG. 10 is a circuit diagram showing an example in which a physical random number generation circuit is provided inside the IC-A.

As shown in FIG. 10, a physical random number generation circuit 44 is provided inside the IC-A, and this physical random number generation circuit 44 measures the interval of generation or the frequency of generation of random pulses generated from an external noise source 43 and generates physical random numbers. The physical random numbers that the physical random number generation circuit 44 generates are inputted to the first and second selector circuits 30 inside the IC-A and IC-B. Processing operations on and after the first and second selector circuits 30 are similar to those in the example shown in the first embodiment. Although the present embodiment is shown as a variation example of the first embodiment, it is of course possible to combine with the second embodiment, the third embodiment, or the fourth embodiment.

For example, electrical noise such as a thermal noise is given as the random pulse generated from the noise source 43. Other than the mode in which the noise source 43 is provided in the external, for example, a random signal of the thermoelectron in a semiconductor element or the like may be utilized.

By employing the physical random number whose unpredictability is high and switching the corresponding relationship between the internal signals and the external input/output terminals in the connection between devices, the concealment property can be further enhanced.

(Sixth Embodiment)

Although in the first embodiment through the fourth embodiment, shown is an example in which the pseudo-random number generation circuits are employed and in the fifth embodiment the physical random number generation circuit is employed, in the present embodiment, shown is an example in which counters are employed instead of random numbers.

Figure 11:
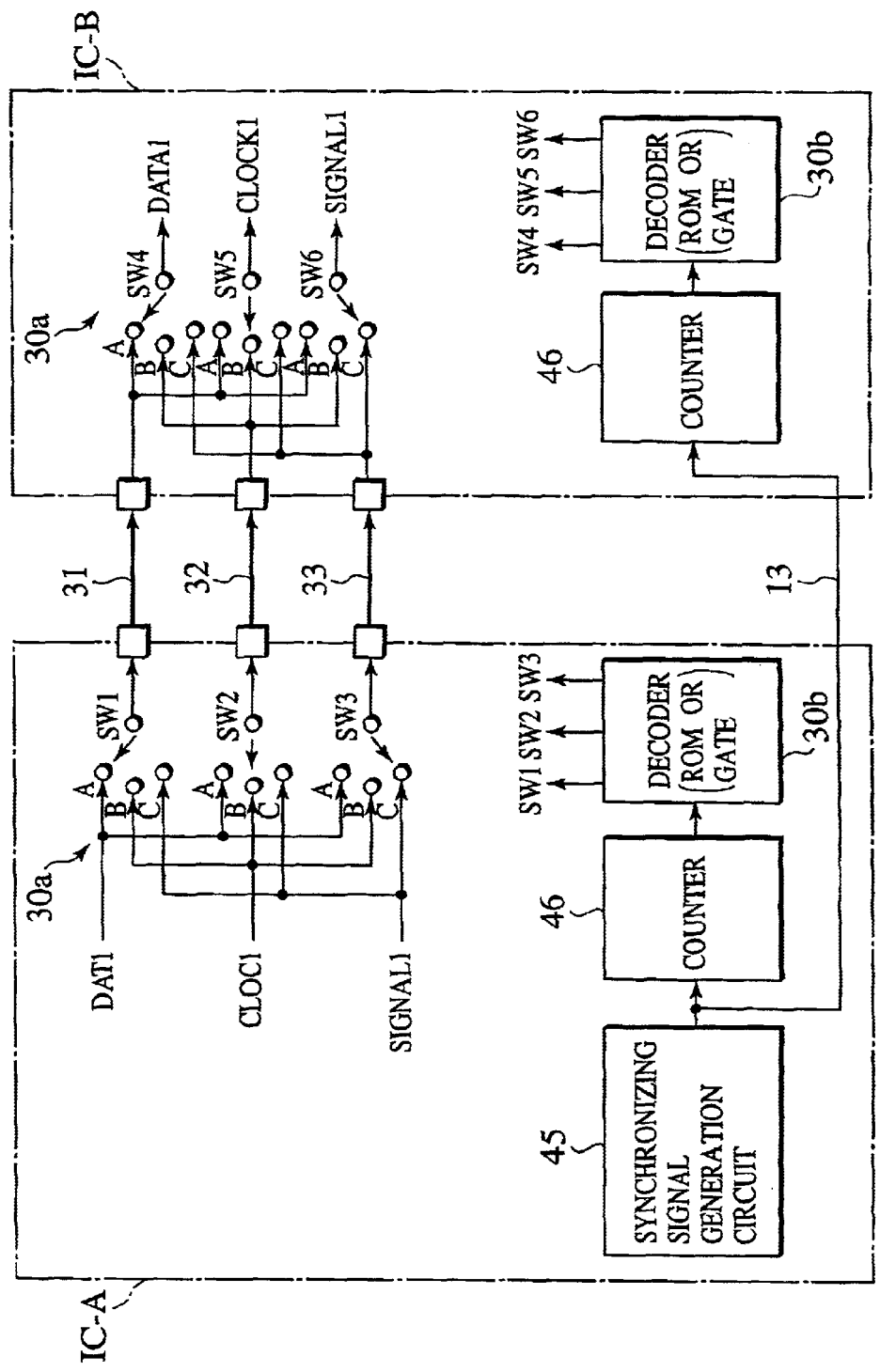
FIG. 11 is a circuit diagram showing an example in which a counter is provided inside the IC-A and the IC-B.

As shown in FIG. 11, counter values generated in first and second counters 46 inside the IC-A and the IC-B are inputted to the decoder circuits 30b, respectively, and the decoder circuits 30b switch a connection pattern between devices according to the inputted counter values. At this time, when the decoder circuits 30b convert the inputted counter values according to a predetermined mode set up between devices in advance and switch the connection pattern between the internal signals and the external input/output terminals in the connection between the devices, employing the values after the conversion, the concealment property can be further enhanced.

By a synchronizing signal that a synchronizing signal generation circuit 45 in the IC-A generates at a predetermined timing, the counter values that the first and second counters 46 in the respective ICs generate can be synchronized, and when the counter values are frequently reset, it is possible to disturb a person who is trying to exploit data.

The above can be realized only by employing simple counter circuits instead of a complex random number generation circuit, and there is no restriction or the like that, for example, a special process is needed in a case where the SEED data value is zero such as in the M-sequence random number generation circuits explained before.

(Processing Operation Example)

The first embodiment through the sixth embodiment are explained in detail above, and here, processing operation examples by an interface security system according to the present invention are explained in detail.

Figure 12:
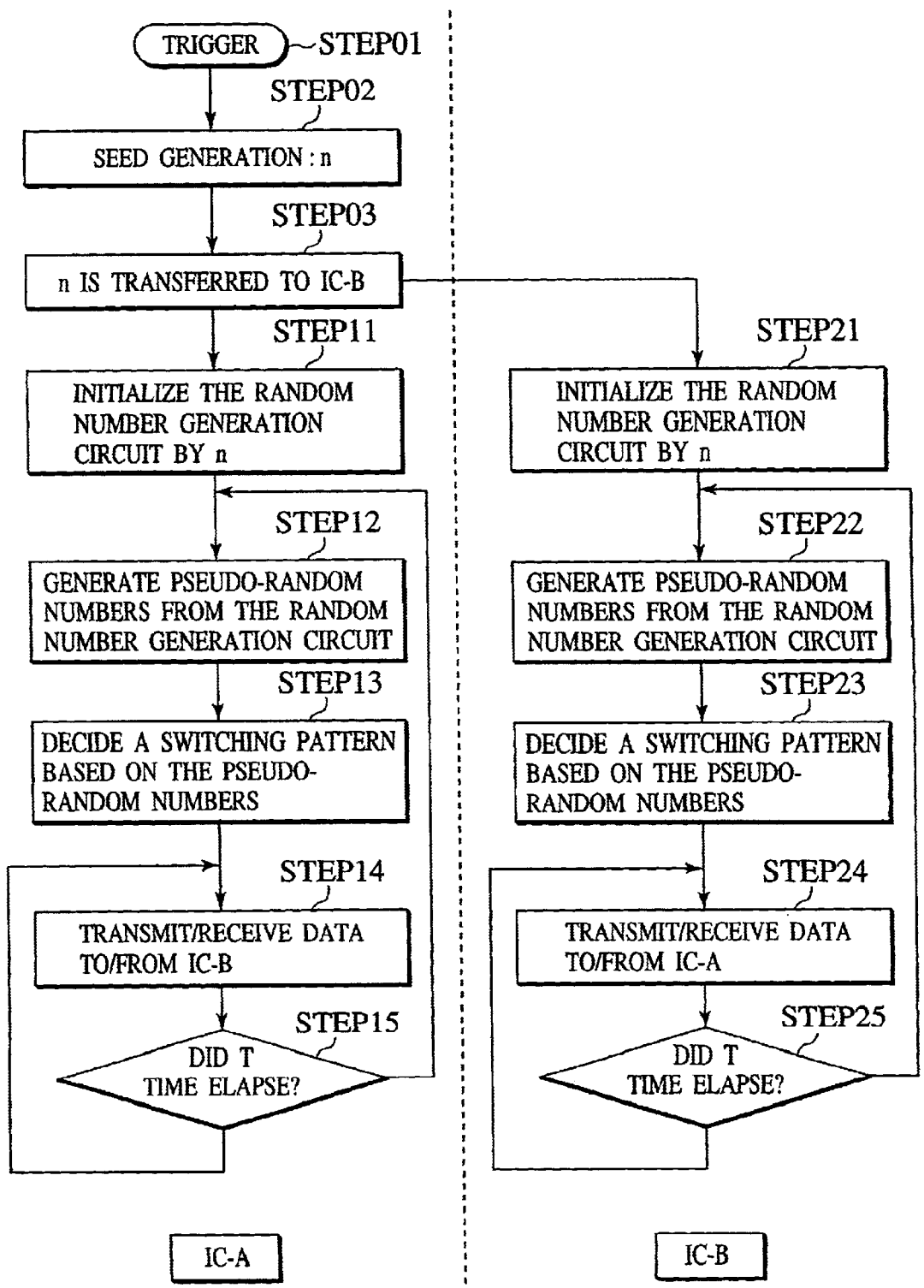
FIG. 12 is a flow chart showing a processing operation example by the interface security system shown in the first embodiment and the second embodiment.

FIG. 12 is a flow chart showing a processing operation example by the interface security system, for example, shown in the first embodiment and the second embodiment. That is, the processing operation example corresponds to a mode in which seeds of random numbers are generated in the SEED generation circuit 10 inside the IC-A and are utilized in the random number generation circuit inside the IC-A as well as being transferred to the random number generation circuit inside the IC-B.

For example, the SEED generation circuit 10 inside the IC-A generates a seed of a random number, n, (Step02) on a predetermined trigger such as at a time of power on or at a time of play button pressing (Step01) and transfers this seed of a random number, n, to the IC-B side (Step03).

Then, inside the respective IC-A and IC-B, the following processing is performed. First, the first and second random number generation circuits 20 are initialized by the seed of a random number, n, (Step11 and Step21), and the random number generation circuits 20 generate pseudo-random numbers (Step12 and Step22). Further, the first and second selector circuits 30 decide a connection pattern based on pseudo-random numbers generated from the random number generation circuits 20 and switch the corresponding relationship of the connection between the IC-A and B (connection pattern between the internal signals and the external input/output terminals) in synchronization to each other (Step13 and Step23). After the corresponding relationship of the connection between the IC-A and B is established, sending/receiving data is performed between the IC-A and B (Step14 and Step24).

After the connection pattern is decided and switched at Step13 and Step23, until a predetermined time period (T time) elapses, data transmitting/receiving processing is continuously performed between the IC-A and B (Step 14 and Step 24). After the predetermined time period (T time) elapses (Step15 and Step25), the steps return to Step12 and Step22 again, the random number generation circuits 20 generate new pseudo-random numbers, and the first and second selector circuits 30 decide a new connection pattern based on the pseudo-random numbers (Step13 and Step23).

When a predetermined trigger is generated (Step01), the SEED generation circuit 10 inside the IC-A generates a seed of a random number, n, over again (Step02) and transfers this seed of a random number, n, to the IC-B side (Step03).

Figure 13:
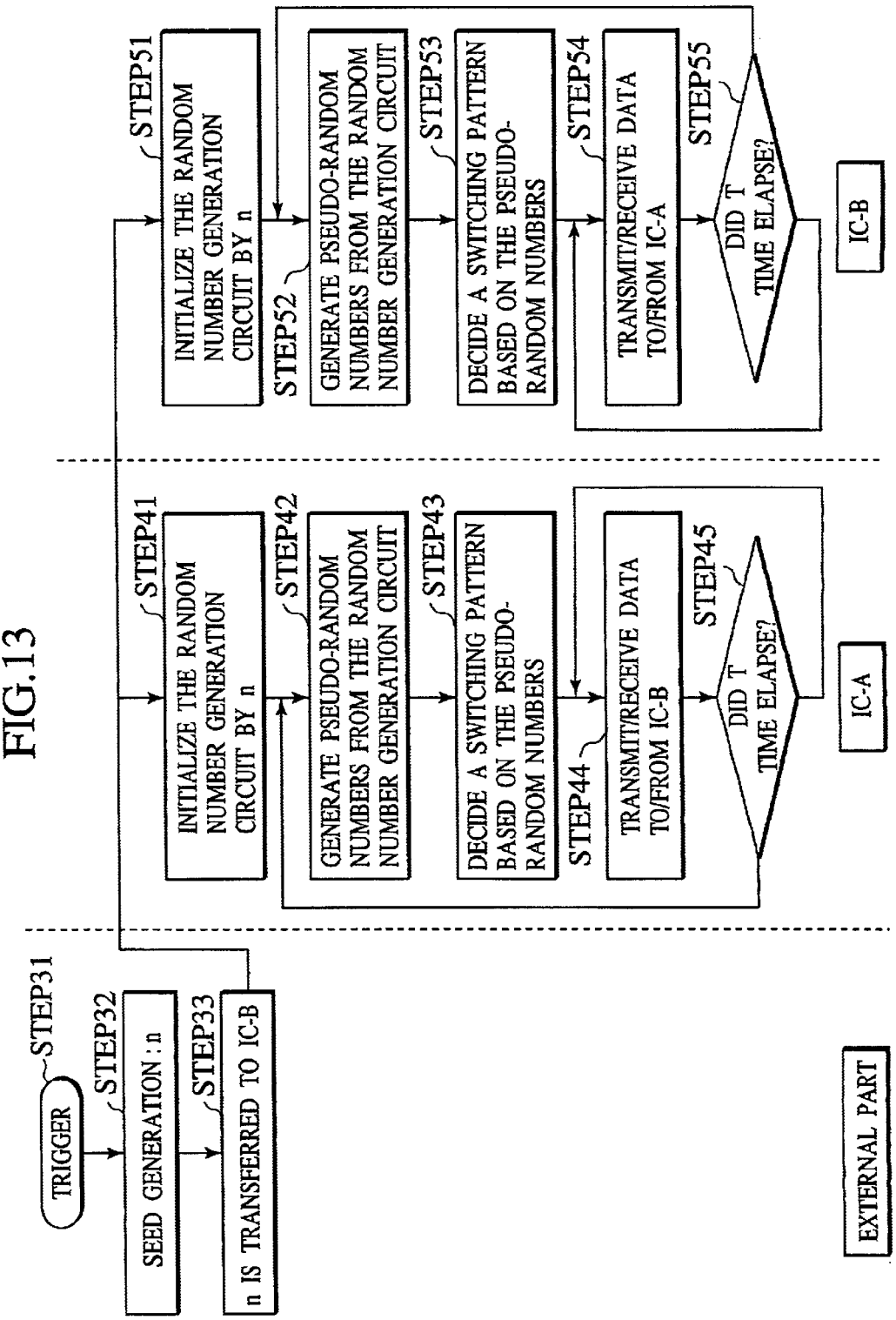
FIG. 13 is a flow chart showing a processing operation example by an interface security system shown in the third embodiment.

FIG. 13 is a flow chart showing a processing operation example by an interface security system shown, for example, in the third embodiment. That is, the example is a processing operation example of a mode in which a seed of a random number is generated in the SEED generation circuit 10 of the external and is transferred to the first random number generation circuit of the IC-A and the second random number generation circuit of the IC-B.

For example, a seed of a random number, n, is generated in the SEED generation circuit 10 installed in the external (Step32) on a predetermined trigger such as at a time of power on or a time of play button pressing (Step31), and this seed of a random number, n, is transferred to both of the IC-A and the IC-B (Step33).

Then, the following processing is performed in the respective IC-A and the IC-B. First, the first and second random number generation circuits 20 are initialized by the seed of a random number, n, (Step41 and Step51), and the first and second random number generation circuits 20 generate pseudo-random numbers (Step42 and Step52). The first and second selector circuits 30 decide a connection pattern based on the pseudo-random numbers generated from the first and second random number generation circuits 20 and switch a corresponding relationship in the connection between the IC-A and B (connection pattern between the internal signals and the external input/output terminals) in synchronization to each other (Step43 and Step53). After the connection pattern between the IC-A and B is established, sending/receiving data is performed between the IC-A and B (Step44 and Step54).

After the connection pattern is decided and switched at Step43 and Step53, until a predetermined time period (T time) elapses, data transmitting/receiving processing is continuously performed between the IC-A and B (Step44 and Step54) After the predetermined time period (T time) elapses (Step45 and Step55), the steps return to Step12 and Step22 again, the random number generation circuits 20 generate new pseudo-random numbers, and the first and second selector circuits 30 decide a new connection pattern based on the pseudo-random numbers (Step43 and Step53).

When a predetermined trigger is generated (Step31), the SEED generation circuit 10 in the external generates a seed of a random number, n, over again (Step32) and transfers this seed of a random number, n, to both of the IC-A and the IC-B (Step33).

Although in the processing operation examples shown in FIG. 12 and FIG. 13, the connection pattern is switched every predetermined time (T time), by setting the value of T so as to change randomly, a further effectiveness maybe brought about.

Although FIG. 12 and FIG. 13 show the processing operation examples in which switching of the corresponding relationship in the connection between the IC-A and B (connection pattern between the internal signals and the external input/output terminals) is performed every predetermined time (T time), next shown is a processing operation example in which switching of the connection pattern is performed every time data transmission/reception is performed between the IC-A and B.

Figure 14:
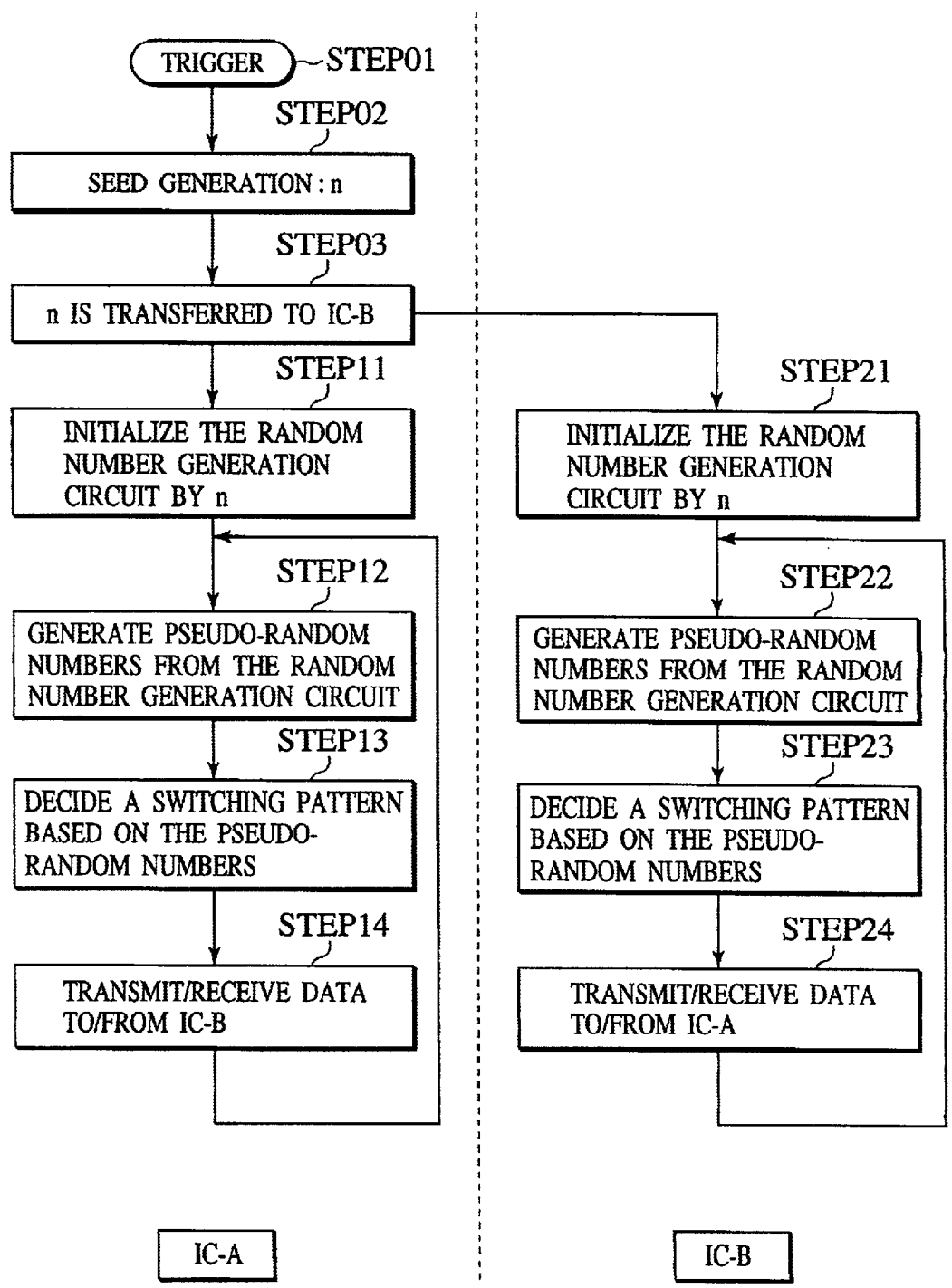
FIG. 14 is a flow chart showing a processing operation example of a case where the connection pattern is switched every time data transmission/reception is performed between the IC-A and B.

FIG. 14 corresponds to a processing operation example of a case where the connection pattern is switched every time data transmission/reception is performed between the IC-A and B in a mode in which a seed of a random number is generated in the SEED generation circuit 10 inside the IC-A, is utilized in the first random number generation circuit 20 inside the IC-A, and is transferred to the second random number generation circuit 20 inside the IC-B. A difference from the process shown in FIG. 12 is that after the data transmission/reception is performed between the IC-A and B (Step14 and Step24), the steps return to Step12 and Step22 again unconditionally, the first and second random number generation circuits 20 generate new pseudo-random numbers, and the first and second selector circuits 30 decide a new connection pattern based on the pseudo-random numbers (Step13 and Step23).

Figure 15:
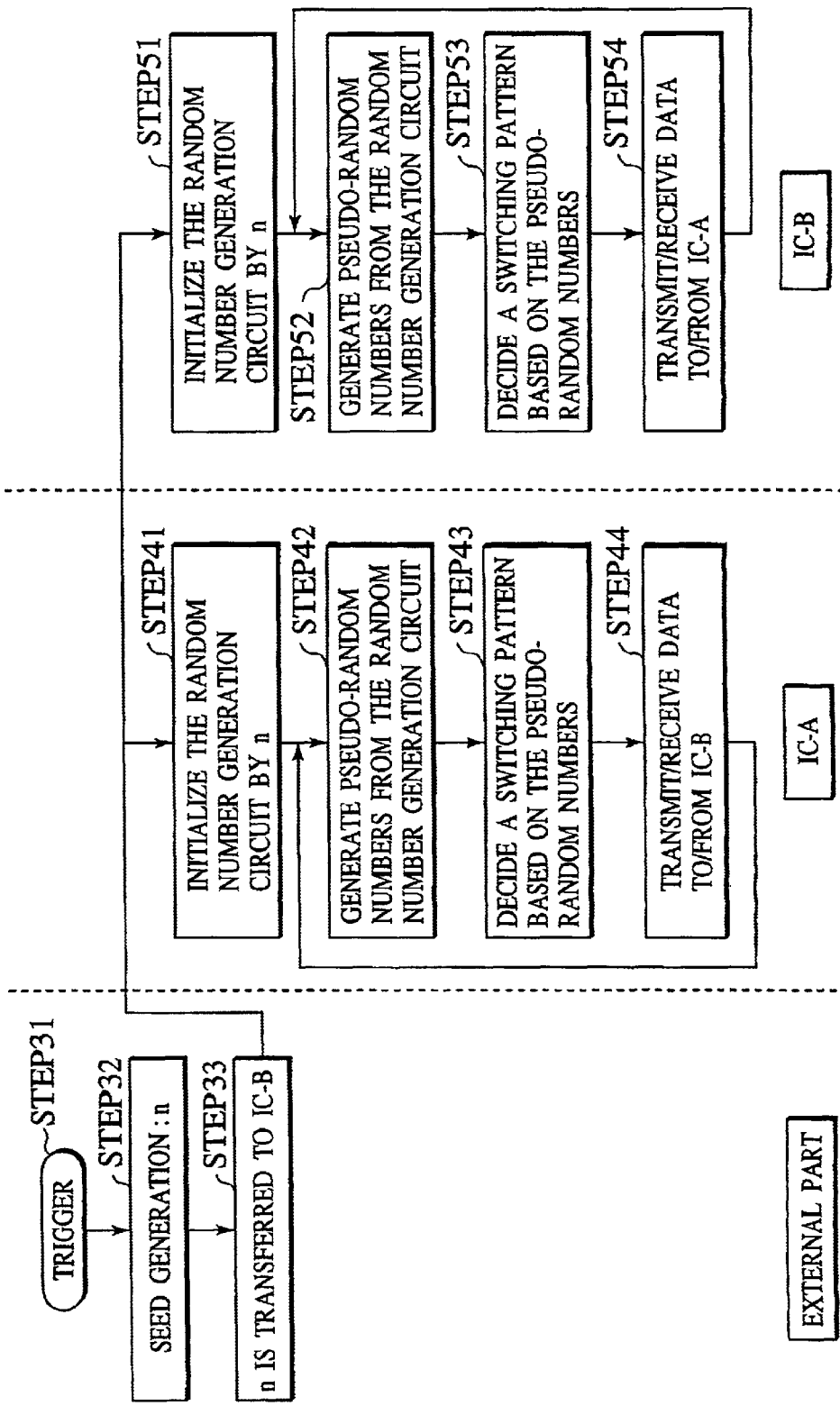
FIG. 15 is a flow chart showing a processing operation example of a case where the connection pattern is switched.

FIG. 15 corresponds to a processing operation example of a case where the connection pattern is switched every time data transmission/reception is performed between the IC-A and B in a mode in which a seed of a random number is generated in the SEED generation circuit 10 in the external and is utilized in the first random number generation circuit inside the IC-A and the second random number generation circuit inside the IC-B. A difference from the process shown in FIG. 13 is that after the data transmission/reception is performed between the IC-A and B (Step44 and Step54), the steps return to Step42 and Step52 again unconditionally, the first and second random number generation circuits 20 generate new pseudo-random numbers, and the first and second selector circuits 30 decide a new connection pattern based on the pseudo-random numbers (Step43 and Step53).

As shown in FIG. 14 and FIG. 15, since the connection pattern is switched every time data transmission/reception is performed between the IC-A and B, illegal copy or the like can be prevented further effectively.

Additional advantage and modifications will readily occur to those skilled in the art. Therefore, the invention in its broader aspects is not limited to the specific details and described herein. Accordingly, various modifications may be made without departing from the spirit or scope of the general inventive concept as defined by appended claims and their equivalents.

For example, although an interface between ICs is explained as an example in the present embodiments, the present invention is not limited to an interface between ICs and can be applied to various parts between devices which may be an interface.

As explained above, in the present invention, since a corresponding relationship between transmitted/received signals and external terminals is switched in accordance with a connection pattern fixed between the respective devices, it becomes difficult for a third party to specify data flowing between the devices, and illegal copy of data or the like can be prevented.

When a connection pattern is selected, by utilizing random numbers or the like whose periodicity, regularity, and repeatability are low and whose unpredictability is high, a further effectiveness may be brought about.

By switching not only a corresponding relationship between transmitted/received signals and external terminals but also a terminal input/output relationship, specifying data flowing between devices becomes further difficult.

What is claimed is:

1. An interface security system between devices connected to each other and transmitting/receiving a signal, the interface security system comprising:
   a first device transmitting/receiving a signal, the first device including:
   a first selector configured to select a connection pattern between the signal transmitted/received and a first external terminal configured to transmit/receive the signal based on a switch signal, the first selector including a first switch switching a connection between the signal and the first external terminal in accordance with the connection pattern selected by the first selector, and a first counter configured to generate counter values in synchronization between the first and second devices and to send the counter values to the second selector, the counter values being used for deciding a connection pattern; and a second device connected to said first device and configured to transmit/receive a signal, the second device including:

a second selector configured to select a connection pattern between the signal transmitted/received and a second external terminal configured to transmit/receive the signal based on a switch signal, the second selector including a second switch configured to switch a connection between the signal and the second external terminal in accordance with the connection pattern selected by the second selector, and a second counter configured to generate counter values in synchronization between the first and second devices and to send the counter values to the first selector, the counter values being used for deciding a connection pattern; wherein the second selector inputs a switch signal of the same value as the switch signal that the first selector inputs, and the first and second selectors decide connection patterns, respectively, based on the counter values that the first and second counters generate.

2. An interface security system between devices connected to each other and transmitting/receiving a signal, the interface security system comprising:

a first device configured to transmit/receive a signal, the first device including:

a first selector configured to select a connection pattern between the signal transmitted/received and a first external terminal configured to transmit/receive the signal based on a switch signal, the first selector including a first switch configured to switch a connection between the signal and the first external terminal in accordance with the connection pattern selected by the first selector, a first bidirectional buffer connected to the first external terminal, and a first pseudo-random number generator configured to generate pseudo-random number sequences based on seeds of random numbers as initial values; and a second device connected to said first device and configured to transmit/receive a signal, the second device including:

a second selector configured to select a connection pattern between the signal transmitted/received and a second external terminal configured to transmit/receive the signal based on a switch signal, the second selector including a second switch switching a connection between the signal and the second external terminal in accordance with the connection pattern selected by the second selector, a second bidirectional buffer connected to the second external terminal, and a second pseudo-random number generator configured to generate pseudo-random number sequences based on the seeds of random numbers as initial values; wherein the second selector inputs a switch signal of the same value as the switch signal that the first selector inputs, the first and second selectors control the first and second bidirectional buffers, respectively, so as to switch the directions of the input/output of the first and second external terminals in accordance with the connection pattern, and the first and second selectors decide connection patterns, respectively, based on the pseudo-random number sequences that the first and second pseudo-random number generators generate.

3. The interface security system according to claim 2, wherein:

said first device includes a seed generator generating a seed of the random number and sending it to the first pseudo-random number generator and the second pseudo-random number generator; and the first and second pseudo-random number generators generate the pseudo-random number sequences using the seed of the random number that the seed generator generates as an initial value.

4. The interface security system according to claim 3, wherein:

said first device includes a cryptography circuit encrypting the seed of the random number that the seed generator generates in a predetermined cryptography mode and transferring it to the second device; and said second device includes a decode circuit decoding the encrypted seed of the random number transferred from the first device in a predetermined cryptography mode and sending it to the second pseudo-random number generator.

5. The interface security system according to claim 3, wherein:

the seed generator is provided in the external of the first device and the second device; and the seed generator delivers the generated seed to the random number to first and second pseudo-random number generators of the first and second devices.

6. The interface security system according to claim 2, wherein:

said first device includes a physical random number generator generating a physical random number from electrical noise inputted from a noise source and sending the physical random number to both of the first selector of the first device and the second selector of the second device; and the first and second selectors of the first and second devices decide a connection pattern based on the physical random number sequence.

7. The interface security system according to claim 2, wherein the first and second selectors select the connection pattern and switch the connection at a predetermined time interval.

8. The interface security system according to claim 2, wherein the first and second selectors select the connection pattern and switch the connection each time the signal is transmitted/received between the first and second devices.

9. The interface security system according to claim 2, wherein said first and said second devices are semiconductor devices which are resin sealed, respectively.

10. An interface security method between first and second devices connected to each other and transmit/receive a signal, the interface security method comprising:

selecting a connection pattern between a signal transmitted/received and a first external terminal in the first device configured to transmit/receive the signal based on a switch signal;

switching a connection between the signal and the first external terminal in accordance with the connection pattern selected;

selecting a connection pattern between a signal transmitted/received and a second external terminal in the second device configured to transmit/receive the signal based on a switch signal having the same value as that of the switch signal of the first device;

switching a connection between the signal and the second external terminal in accordance with the connection pattern selected; and generating counter values in synchronization between the first and second devices, and wherein said selection of the connection patterns in the first and second devices is based on the counter values.

11. An interface security method between first and second devices connected to each other to transmit/receive a signal, the interface security method comprising:

selecting a connection pattern between a signal transmitted/received and a first external terminal in the first device configured to transmit/receive the signal based on a switch signal;

switching a connection between the signal and the first external terminal in accordance with the connection pattern selected;

selecting a connection pattern between a signal transmitted/received and a second external terminal in the second device configured to transmit/receive the signal based on a switch signal having the same value as that of the switch signal of the first device;

switching a connection between the signal and the second external terminal in accordance with the connection pattern selected;

controlling bidirectional buffers connected to the external terminals of the first and second devices so as to switch the directions of the input/output of the first and second external terminals in accordance with the connection pattern; and generating pseudo-random number sequences using mutually common seeds of random numbers as initial values in the first and second devices, wherein said selection of the connection patterns in the first and second devices is based on the pseudo-random number sequences, respectively.

12. The interface security method according to claim 11, further comprising generating a seed of a random number in the first device and transferring it to the second device, wherein said pseudo-random number sequences in the first and second devices are generated using said seed of the random number as an initial value, respectively.

13. The interface security method according to claim 12, further comprising:

encrypting the seed of the random number that the seed generation step generates in a predetermined cryptography mode in the first device and transmitting it to the second device; and decoding the encrypted seed of the random number transferred from the first device in a predetermined cryptography mode in the second device.

14. The interface security method according to claim 11, further comprising generating seed of a random number in the external and transferring it to both first device and second device, wherein said pseudo-random number sequences in the first and second devices are generated using said seed of the random number as an initial value, respectively.

15. The interface security method according to claim 11, further comprising:

generating a physical random number from electrical noise inputted from a noise source; and sending said physical random number to both first and second device, and wherein said selection of the connection patterns in the first and second devices is based on the physical random number sequence.

16. The interface security method according to claim 11, wherein the selection of the connection patterns and the switching connection between the signal and the external terminal are performed at a predetermined time interval in the first and second devices.

17. The interface security method according to claim 11, wherein the selection of the connection patterns and the switching connection between the signal and the external terminal are performed every time signal transmission/reception is performed between the first and second devices.

18. An interface security system between devices connected to each other and transmitting/receiving a signal, the interface security system comprising:

a first device transmitting/receiving a signal, the first device including:

a first selector configured to select a connection pattern between the signal transmitted/received and a first external terminal configured to transmit/receive the signal based on a switch signal, the first selector including a first switch switching a connection between the signal and the first external terminal in accordance with the connection pattern selected by the first selector; and a second device connected to said first device and configured to transmit/receive a signal, the second device including:

a second selector configured to select a connection pattern between the signal transmitted/received and a second external terminal configured to transmit/receive the signal based on a switch signal, the second selector including a second switch configured to switch a connection between the signal and the second external terminal in accordance with the connection pattern selected by the second selector; wherein the second selector inputs a switch signal of the same value as the switch signal that the first selector inputs, the first device and the second device include first and second pseudo-random number generators generating pseudo-random number sequences using mutually common seeds of random numbers as initial values, respectively, and the first and second selectors decide connection patterns, respectively, based on the pseudo-random number sequences that the first and second pseudo-random number generators generate.

19. An interface security method between first and second devices connected to each other to transmit/receive a signal, the interface security method comprising:

selecting a connection pattern between a signal transmitted/received and a first external terminal in the first device configured to transmit/receive the signal based on a switch signal;

switching a connection between the signal and the first external terminal in accordance with the connection pattern selected;

selecting a connection pattern between a signal transmitted/received and a second external terminal in the second device configured to transmit/receive the signal based on a switch signal having the same value as that of the switch signal of the first device;

switching a connection between the signal and the second external terminal in accordance with the connection pattern selected; and generating pseudo-random number sequences using mutually common seeds of random numbers as initial values in the first and second devices, wherein said selection of the connection patterns in the first and second devices is based on the pseudo-random number sequences, respectively.

* * * * *